March 24, 1931.  L. J. GRUBMAN  1,797,338
EYE MOUNTING FOR DOLLS
Filed Dec. 21, 1928   2 Sheets-Sheet 1
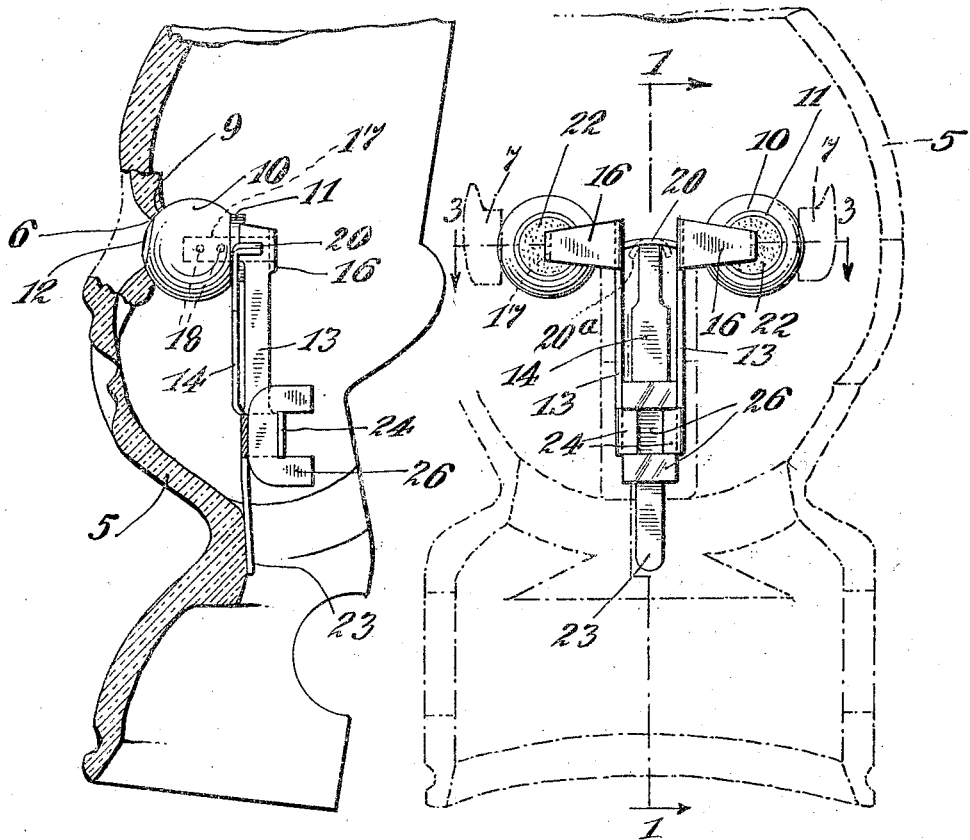
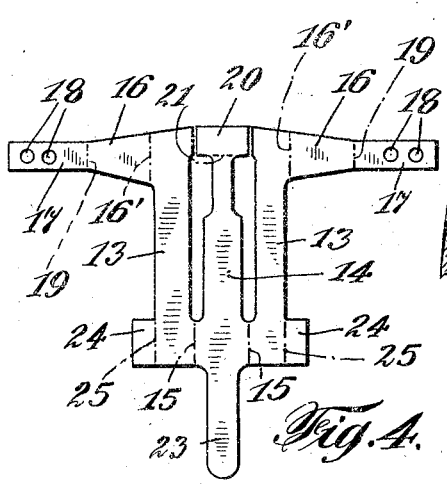
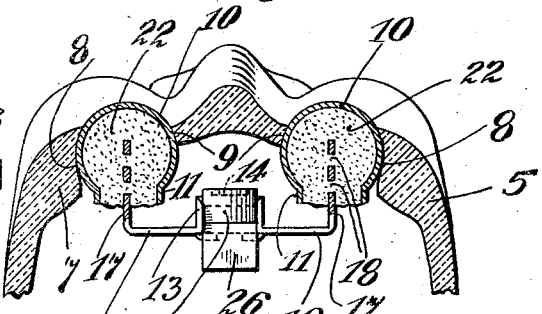
Inventor
Leo J. Grubman
By his Attorney March 24, 1931. L. J. GRUBMAN 1,797,338
EYE MOUNTING FOR DOLLS
Filed Dec. 21, 1928 2 Sheets-Sheet 2
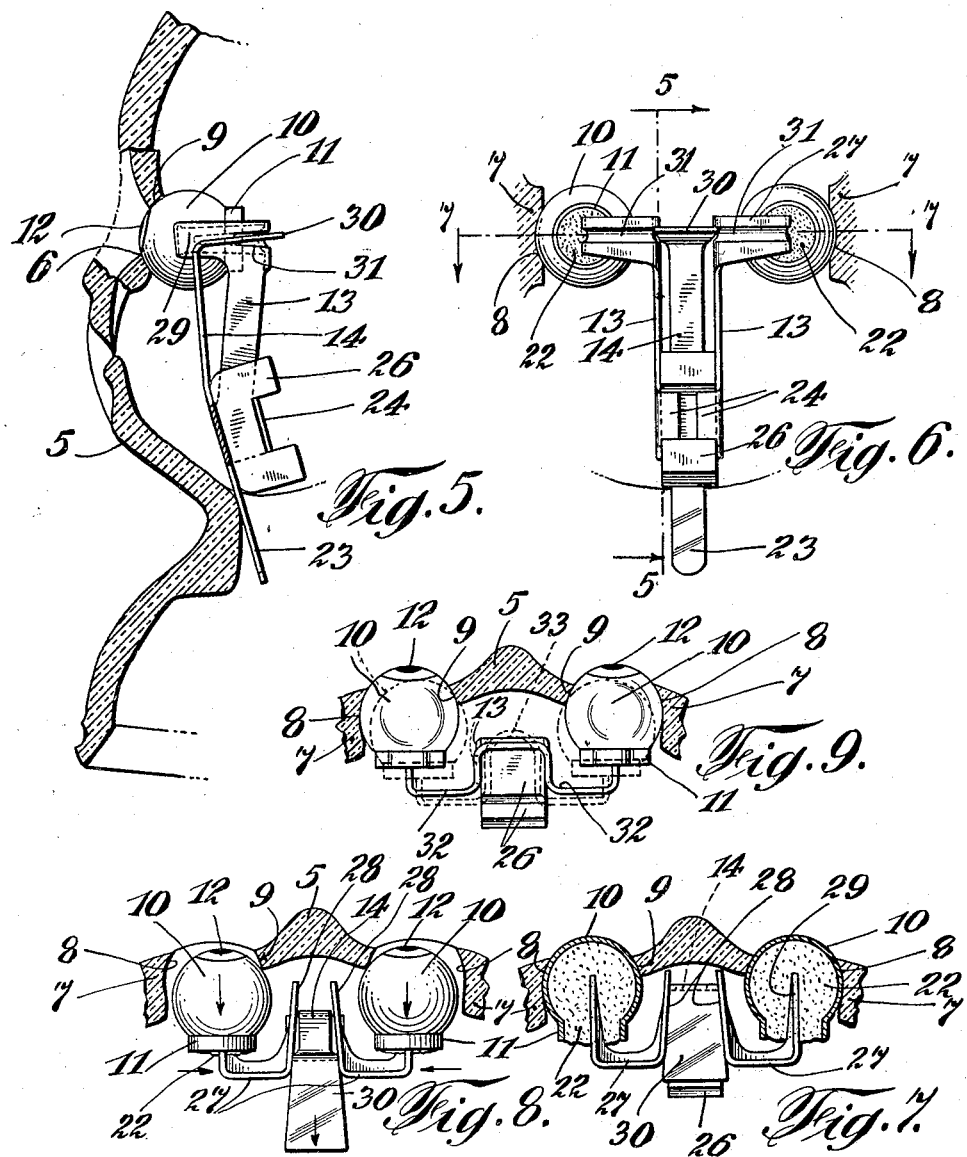

Patented Mar. 24, 1931

1,797,338

UNITED STATES PATENT OFFICE

LEO J. GRUBMAN, OF BELLE HARBOR, NEW YORK

EYE MOUNTING FOR DOLLS

Application filed December 21, 1928. Serial No. 327,605.

This invention relates to eye mountings for dolls, and has for its primary object and purpose to provide an oscillatory eye mounting having directly connected relatively movable parts to which the respective eye members are permanently and rigidly secured and means for locking said parts against relative movement to maintain the eye members in separated relation and in rocking engagement with suitable internal seats formed upon the wall structure of the doll head.

It is a more particular object of the invention to provide an oscillatory eye mounting for dolls having hollow glass eye members and improved means for rigidly and permanently fixing said eye members in accurately predetermined relation to each other upon spaced parts of the mounting.

It is also a further object of the invention to provide a novel form of the weighted frame or pendulum which may be readily stamped from a single sheet of metal to provide relatively bendable parts including means for rigidly attaching a suitable weight to the lower end of the pendulum frame.

It is a further general object of the invention to provide an oscillatory mounting for glass eyes which is of exceedingly simple and inexpensive construction and enables the eyes to be easily, quickly and accurately mounted directly upon the wall of the doll head for oscillatory motion relative to the spaced eye openings formed through the head wall.

With the above and other objects in view, the invention consists in the improved eye mounting for dolls, and in the form, construction and relative arrangement of its several parts as will be hereinafter more fully described, illustrated in the accompanying drawings, and subsequently incorporated in the subjoined claims.

In the drawings, wherein I have illustrated several simple and practical embodiments of the invention, and in which similar reference characters designate corresponding parts throughout the several views,—

Figure 1 is a vertical sectional view through the front portion of a doll head taken substantially on the line 1—1 of Fig. 2, showing one embodiment of my improved eye mounting arranged therein;

Fig. 2 is a rear elevation;

Fig. 3 is a horizontal section taken substantially on the line 3—3 of Fig. 2;

Fig. 4 is a detail plan view of the stamped sheet metal blank from which the mounting is formed;

Fig. 5 is a view similar to Fig. 1 taken on the line 5—5 of Fig. 6, showing a modified form of the device;

Fig. 6 is a rear elevation of said modification;

Fig. 7 is a horizontal section taken on the line 7—7 of Fig. 6;

Fig. 8 is a view similar to Fig. 7 showing the relative positions of the parts in applying the device to its operative position upon the doll head wall; and Fig. 9 is a horizontal sectional view showing another alternative form of the invention.

Referring in detail to the drawings and more particularly to Figs. 1 to 4 thereof, 5 designates the doll head, the front wall of which is provided with the usual eye openings indicated at 6, appropriately located with respect to the nose and other molded features of the head structure.

Upon the inner side of the head wall and at the outer end of each of the elliptical shaped eye openings, said wall is molded with a thickened internally protruding section 7 which is milled out on its inner side face to provide a concave seat indicated at 8 which forms a continuation of the eye member receiving socket 9 formed on the inner side of the front wall of the doll head at each of the eye openings 6.

One of the most important features of my present improvements is to provide simple and reliable means for accurately setting or mounting glass eyes of the movable or oscillating type. I have herein shown the eye proper, designated at 10, in the form of a substantially perfect ball or sphere. These balls are blown from the end of a glass tube and at the point of severance or disconnection of the hollow ball or sphere from the end of the tube, a short neck or nipple indicated at 11 is produced. The wall of the glass eyeball is not of great thickness and heretofore, it has been necessary to handle these hollow glass balls with great care in order to prevent breakage thereof. Upon the peripheral surface of the glass ball opposite the point from which the nipple 11 projects the iris, indicated at 12 is painted.

In one embodiment of my improved mounting or setting for the glass eyeballs, I produce by means of a suitable cutting die the sheet metal stamping, seen in Fig. 4 of the drawings. This stamping includes the parallel side parts 13 and an intermediate part 14 separated along its longitudinal edges from the parts 13, said parts 13 and 14 remaining integrally connected with each other at one of their ends. At such connected ends, the parts 13 are adapted to be bent along the lines 15 and positioned in a plane at right angles to the plane of the intermediate part 14. Each of the parts 13 at its other end has a lateral extension including a tapering section 16 and the elongated section 17 which is provided with spaced openings 18. The sections 16 are adapted to be bent along the lines 16' to extend outwardly from the side portions 13 and the sections 17 are bent along the lines 19 so as to extend at right angles to the sections 16. The corresponding end of the central part 14 is provided with a rectangular head 20 which is bent along the line 21 to project between the ends of the spaced parts 13. This head piece 20 is preferably bowed or curved longitudinally as seen in Fig. 2 of the drawings, and in its initial form is curved as indicated in dotted lines at 20ᵃ in said figure so that the opposite side edges of this head piece are spaced from the arms 13, thus permitting the ends of the arms to be moved inwardly towards each other.

In attaching the glass eyeballs 10 to the mounting, these eyeballs are adapted to be first arranged in the sockets 9 of a model head and adjusted to properly position the centers of the irises 12 of the eyeballs with relation to the respective eye openings 6. While the eyeballs are retained in this adjusted position, the angularly extending sections 17 of the mounting are inserted inwardly through the open necks 11 at the rear sides of the respective eyeballs. A cementitious or thermoplastic material indicated at 22 is then poured into the hollow eyeballs to completely fill the same. This material of course, will flow freely through the openings 18 and when it becomes set or hard, the extension 17 will be permanently and immovably interlocked with this material. In this manner, the two glass eye members are accurately fixed in predetermined positions upon the spaced parts of the oscillatory mounting with respect to the centers of the eye openings in the wall of the doll head.

The sheet metal stamping from which the mounting is formed is further provided at the connected ends of the parts 13 and 14 and centrally thereof with a resiliently yieldable longitudinally extending tongue 23 and with lugs or extensions 24 at the outer edge of each of these side portions 13 which are adapted to be angularly bent along the lines 25 to extend inwardly upon the central part of a weight element 26 of substantially U-shaped form and between the spaced arms thereof. Thus as seen in Fig. 1 of the drawings this weight element may be easily and quickly secured to the movable frame, without necessitating the use of screws, bolts or similar fastening means therefor.

In the application of an eye mounting constructed as above described to the doll head having the internal seats 8 formed on the wall thereof, the upper ends of the side portions 13 of the sheet metal frame are forced inwardly towards each other and the mounting is inserted upwardly through the neck opening of the doll head. The distance between the outer sides of the spaced eye members 10 is then slightly less than the distance between the protrusions or projections 7 on the opposite side walls of the head so that the eye members may be moved forwardly between these projections and into the sockets 9 in the front wall of the doll head. Pressure on the parts 13 of the mounting is then released so that they spring outwardly to their normal positions, thus urging the spherical surfaces of the glass eyeballs at their outer sides into close seating contact with the concave surfaces 8 of the projections 7 on the head wall. By means of pliers or other suitable tool, the rearwardly projecting head part 20 extending between the upper ends of the parts 13 of the mounting may then be expanded or bent from the dotted line position shown in Fig. 2 to the full line position shown in this figure, whereby the opposite side edges of this head 20 are caused to bear against the opposed inner faces of the side parts 13 of the mounting, thus holding the same positively in separated relation and preventing their inward movement towards each other. In this way, the desired bearing pressure of the eye members against the seats 8 may be readily obtained with an absence of such severe frictional resistance as would interfere with the free rocking or oscillating motion of the eye members relative to the walls of the sockets 9. At the same time, all possibility of the displacement of said eye members relative to the seats 8 by shock or jar so that the entire mounting would be released from its position is obviated. Of course, the eye members when thus applied to their operative positions will be disposed with their respective irises 12 in the same accurate relation to the eye openings 6 of the doll head wall as was attained in their initial adjustment when said eye members were secured to the parts 17 of the mounting in the manner above explained.

In Figs. 5 to 8 of the drawings, I have shown a slightly different form of the invention, wherein each of the side parts 13 of the sheet metal mounting is provided at its upper end with the U-shaped portion 27. The inner opposed arms of these U-shaped portions 27 extend forwardly in convergent relation to each other as at 28, while the eyeballs 10 are secured to the other or outer arms 29 of said portions 27 as above described. The central part 14 of the mounting in this construction is provided at its upper end with a relatively long rearwardly projecting angular head 30 gradually increasing in width to its rear end and extending between the arms 28. Preferably, these U-shaped end portions 27 of the parts 13 are formed with the grooves indicated at 31, and the opposite side edges of the head 30 is positioned in these grooves. It will be apparent from this description that by pressing the upper end of the central part 14 of the mounting rearwardly, the angular extension or head 30 thereof may be positioned relative to the arms 28 as shown in Fig. 8 of the drawings so that the upper ends of the parts 13 of the mounting may spring inwardly to a normal position more or less closely adjacent to each other. The eyeballs 10 carried by the arms 29 may thus be readily positioned between the seats 8 on the opposite side walls of the head, and the pressure on the part 14 then released. This part will then spring forwardly towards the front wall of the doll head and the tapering head or extension 30 riding in the grooves 31 will act as a wedge, forcing the upper U-shaped ends of the parts 13 in relatively opposite directions and thus urging the eyeballs laterally into bearing contact with the surfaces of the concave seats.

In Fig. 9 of the drawings, I have illustrated a construction in which the central part 14 of the mounting above described is omitted and only the parallel side parts provided. These parts 13 are formed at their upper ends with laterally and outwardly extended U-shaped bends 32 upon the free ends of which the eyeballs 10 are secured. The inner sides of the U-shaped parts 32 are connected by the central bend 33, and by pressing these opposed inner portions of the bends 32 towards each other, the central bend 33 may be flexed or held under tension, thus urging the eyeballs 10 inwardly towards each other from their normal separated positions. Upon the release of such pressure after the eyeballs have been engaged in the sockets 9, the central bend 33 will resume its normal form, thereby expanding the U-shaped portions 32 laterally in opposite directions and urging the outer sides of the eyeball members into rocking contact with the seats 8.

From the foregoing description considered in connection with the accompanying drawings, it will be seen that I have devised a very serviceable and easily operated mounting for glass eyes for dolls which enables the operator to properly mount the eyes within the doll in a fraction of the time heretofore required. By securing the eyes to the mounting in the manner above explained, great stability is obtained and also the possibility that the eyes may be broken in the operation of applying or mounting the same within the doll head is practically precluded.

I have herein shown several practical embodiments of my present improvements, but in the further development thereof, it will be understood that the essential features of the device might also be incorporated in other structural forms, and I accordingly reserve the privilege of resorting to all such legitimate changes in the form, construction and relative arrangement of the several parts as may be fairly embodied within the spirit and scope of the invention as claimed.

I claim:

1. An oscillatory eye mounting for dolls consisting of a sheet metal blank having parts bendable relative to each other and providing spaced relatively yieldable eye member carrying parts said blank also including an additional part extending between said eye member carrying parts yieldable relative to the latter and cooperating therewith to retain said eye member carrying parts in definitely spaced relation to each other, a weight member, and said sheet metal blank having additional bendable parts engaged with said weight member to secure the same in fixed relation to said first named parts.

2. In an oscillatory eye mounting for dolls, a stamped sheet metal blank having spaced portions bendable relative to each other to provide spaced parallel side parts, each of said parts having lateral extensions at one end bendable relative thereto to provide an eye member carrying arm, and said blank including an integrally formed part intermediate of said side parts having means at one of its ends to cooperate with the latter and retain the same in definitely spaced relation to each other.

3. In an oscillatory eye mounting for dolls, a stamped sheet metal blank having spaced portions bendable relative to each other to provide spaced relatively movable parts, each of said parts having lateral extensions at one end bendable relative thereto to provide an eye member carrying arm, said spaced parts at their other ends having relatively bendable extensions adapted for engagement with a weight member to retain the same in fixed position with respect to said parts, and said blank including a part intermediate of said side parts having means at one of its ends to cooperate with the latter and retain the same in definitely spaced relation to each other.

4. As a new article of manufacture, an oscillatory eye mounting for dolls comprising a single sheet metal structure having spaced relatively yieldable elongated parts provided at one of their ends with angularly bent eye-carrying portions, an independently yieldable part integral with said spaced parts at the other ends thereof and provided at its free end with means cooperating with said spaced parts to prevent inward movement of the latter towards each other.

5. As a new article of manufacture, an oscillatory eye mounting for dolls comprising a single sheet metal structure having spaced relatively yieldable elongated parts provided at one of their ends with angularly bent eye-carrying portions, an independently yieldable part integral with said spaced parts at the other ends thereof and provided at its free end with means cooperating with said spaced parts to prevent inward movement of the latter towards each other, and additional bendable projections at the integrally connected ends of said parts adapted to engage and secure a pendulum weight in attached relation thereto.

6. In an eye mounting for dolls, an eye carrying frame comprising a unitary sheet metal structure having spaced parallel parts provided at one of their ends with substantially U-shaped portions, each having a forwardly projecting laterally offset terminal, an eye member fixed upon the terminal of each of said U-shaped portions and supported thereby in laterally offset relation from one of said parallel parts, a weight member positioned between the other ends of said parallel parts, and each of said parts at its latter end having a portion thereof bent inwardly upon the weight member, to fixedly secure the same to said sheet metal frame.

7. In an eye mounting for dolls, an eye carrying frame comprising a unitary sheet metal structure having spaced parallel parts provided at one of their ends with substantially U-shaped portions, each having a forwardly projecting laterally offset terminal, an eye member fixed upon the terminal of each of said U-shaped portions and supported thereby in laterally offset relation from one of said parallel parts, a U-shaped weight member positioned between the other ends of said parallel parts of the frame, and each of said parts having a portion projecting from one edge thereof inwardly between the arms of said weight member to secure the same to said frame.

In testimony that I claim the foregoing as my invention, I have signed my name hereto.

LEO J. GRUBMAN.